United States Patent
Gustavsson et al.

(10) Patent No.: US 6,804,796 B2
(45) Date of Patent: Oct. 12, 2004

(54) METHOD AND TEST TOOL FOR VERIFYING THE FUNCTIONALITY OF A SOFTWARE BASED UNIT

(75) Inventors: Johan Gustavsson, Huddinge (SE); Stefan Johansson, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 09/836,987

(22) Filed: Apr. 18, 2001

(65) Prior Publication Data

US 2001/0052089 A1 Dec. 13, 2001

(30) Foreign Application Priority Data

Apr. 27, 2000 (SE) ............................................. 0001535

(51) Int. Cl.[7] ...................... G06F 11/00; H03M 13/00
(52) U.S. Cl. ...................... 714/38; 714/715; 714/719; 717/124
(58) Field of Search ........................... 714/38, 715, 719, 714/819; 717/124

(56) References Cited

U.S. PATENT DOCUMENTS

| | | | | |
|---|---|---|---|---|
| 5,233,611 A | * | 8/1993 | Triantafyllos et al. | 714/46 |
| 5,371,883 A | * | 12/1994 | Gross et al. | 714/38 |
| 5,521,849 A | * | 5/1996 | Adelson et al. | 702/119 |
| 5,809,108 A | | 9/1998 | Thompson et al. | |
| 5,961,609 A | | 10/1999 | Kayes et al. | |
| 6,128,761 A | * | 10/2000 | Benayoun et al. | 714/758 |
| 6,158,031 A | * | 12/2000 | Mack et al. | 714/724 |
| 6,182,245 B1 | * | 1/2001 | Akin et al. | 714/38 |
| 6,427,000 B1 | * | 7/2002 | Mumford et al. | 379/9 |
| 6,484,282 B1 | * | 11/2002 | Tsuto | 714/738 |
| 6,519,265 B1 | * | 2/2003 | Liu et al. | 370/463 |

FOREIGN PATENT DOCUMENTS

EP 1014265 A1 6/2000

* cited by examiner

Primary Examiner—Scott Baderman
Assistant Examiner—Anne L. Damiano
(74) Attorney, Agent, or Firm—Workman Nydegger

(57) ABSTRACT

A method and a test tool 110 are provided for verifying the functionality of a software based unit 100 which is provided with an interface 105 for its external communication. Pre-recorded data is used for the reproduction of a test case and for the verification of a unit subject to the test case. The pre-recorded data includes pre-recorded input data 125 and pre-recorded output data 126. The pre-recorded input data is applied to an interface of the unit and the pre-recorded output data is compared with the data transmitted from the unit in response to the applied pre-recorded input data. If the data transmitted from the unit is in correspondence with the pre-recorded output data, the functionality of the unit in accordance with the specific test case has been verified.

45 Claims, 6 Drawing Sheets

METHOD AND TEST TOOL FOR VERIFYING THE FUNCTIONALITY OF A SOFTWARE BASED UNIT

TECHNICAL FIELD

The present invention relates to a method and a test tool for verifying the functionality of a software based unit which is provided with an interface for its external communication.

BACKGROUND OF THE INVENTION

When developing products, whether it is hardware or software products or a combination of the two, the products have to be thoroughly tested in order to verify their functionality prior to offering the products on the intended market.

Often, the verification, or testing, of a product has to be performed during all phases that are included in an entire product development cycle. Within the industries of telecommunications, computers and software, a product, or an element being part of an overall product, is most often characterised in that it includes one or more interfaces with which it communicates with an environment, the environment being external to the product or, in case of a product element, defined by the overall product. A significant part of the verification, or testing, of such a product or element, both which hereinafter will be referred to as a unit, constitutes so called "black box" testing. The use of the term black box for a unit indicates that there is no knowledge of the internal mechanisms of the unit. Even if some of the unit's internal mechanisms or behaviour were known, it is in many cases more appropriate to view the unit as a black box when performing tests and verifying the functionality of the unit. When performing black box testing on a unit, specific input data to one or more of the interfaces of the unit will result in corresponding output data from the interfaces. One of the most commonly used methods for testing a software based unit is to view the unit as a black box and to verify its operation during a number of test cases.

The tests that are necessary to perform when verifying the functionality of a unit during black box testing are normally very time consuming. The personnel conducting the tests normally has to go through a number of different test cases. Each test case involves a high degree of manual interaction, especially during the phase of manual verification of output data, but also for generating the input data specific for the test case to be run.

Today there exists several tools for automated generation of input data, e.g., the test tool "MEDUSA", which is a trademark of Microsoft Corporation. However, a major drawback which still exists, whether these existing test tools are used or not, is that the output data generated by a unit during black box testing still have to be verified manually. Moreover, when using tools which provide automated input generation the result is often huge amount of output data that need to be verified, a cumbersome task for the testing personnel.

The nature of the above mentioned test tools, i.e., automated data input generators, is that they create new sets of data for each run. One of the problems associated with verification of output data is the need for exact knowledge of the input data that corresponded to the output data. If something appears to be wrong in the output data, i.e., if the unit subject to test does not seem to function as expected, it must be possible to reproduce the subset of the input data that revealed the improper functioning of the unit. One obvious reason for this is the desire to use such identified and reproduced input data when repeating the same test case on the unit after the unit has been redesigned or reconfigured. Alternatively, it may be desired to perform the same test case on a second unit of the same kind as the first, in order to investigate whether or not the second unit shows the same improper functioning. Alternatively, it is simply desired to repeat a test case for a number of different units of the same type in order to verify, e.g., during production, that they all functions in accordance with the design.

SUMMARY OF THE INVENTION

The present invention overcomes at least some of the above mentioned problems associated with testing and verification of a product or a part thereof by providing a method and a test tool having the features as defined in the appended claims.

The invention is based on the idea of using pre-recorded data for the reproduction of a test case and for the verification of a unit subject to the test case. The pre-recorded data includes pre-recorded input data and pre-recorded output data. By analysing the pre-recorded input data and the pre-recorded output data, functional relationships are derived between them. These functional relationships are then included as functional output data in the pre-recorded output data. The pre-recorded input data is applied to an interface of the unit and the pre-recorded output data is compared with the data transmitted from the unit in response to the applied pre-recorded input data. If the data transmitted from the unit is in correspondence with the pre-recorded output data, the functionality of the unit in accordance with the specific test case has been verified.

The test case is something which covers a well-defined part of the unit's functionality and intended operation. The kind of unit addressed is a unit which is implemented as software, or software in combination with hardware, and which provides one or more interfaces for interacting with its environment. Furthermore, the unit is of the kind which it is desired, or necessary, to test as a black box, i.e., to test and verify the unit by interacting with its interface(s) as if there was no or little knowledge of the internal behaviour of the unit. The reason for this being, e.g., that the internal behaviour of the unit is at least in part unknown or too complicated or too extensive to be described.

Thus, the present invention and the different aspects thereof concern the process of verifying the functionality of a software based unit which is provided with an interface for its external communication.

According to one aspect of the invention, there is provided a method which includes the steps of: a) placing an external test tool in operative communication with the software based unit by means of a packet data connection, wherein data applied to, and received from, said interface is included in data packets; b) recovering pre-recorded input data relating to a predefined test case and applying said input data on said interface; c) recovering pre-recorded output data having a verified relation with the pre-recorded input data; d) replacing at least part of said pre-recorded output data with functional relationships between said pre-recorded input data and said pre-recorded output data, obtaining a set of functional output data; and e) comparing the output data received from said packet data protocol interface with said set of functional output data.

According to another aspect of the invention, there is provided a test tool which includes: a) interface means for enabling operative communication with the software based unit by means of a packet data connection, wherein the communicated data is included in data packets; and b) processing means for: (i) reading pre-recorded input data relating to a predefined test case; (ii) applying the pre-recorded input on said software based unit via said interface means; (iii) reading pre-recorded output data relating to said predefined test case, the pre-recorded output data having a verified relation with the pre-recorded input data; (iv) replacing at least part of said pre-recorded output data with functional relationships between said pre-recorded input data and said pre-recorded output data, obtaining a set of functional output data; and (v) comparing the output data received from said software based unit via said interface means with said set of functional output data; and c) memory means for storing said functional relationships to be provided to said processing means.

Thus, according to the invention, an external test tool is operatively connected to the software based unit. The test tool is designed with interface means via which it is able to communicate with the software based unit and its interface over a data connection set up between the two interfaces. The test tool includes processing means executing computer instructions for controlling the operation of the test tool when verifying and communicating with the software based unit.

Within the scope of the present invention and the context of this description, a software based unit, or sometimes just unit, is to be interpreted as either a software product, a software component included by a software and/or hardware product, a hardware product including software, or even a complete system, such as a telecommunications or computer system, which includes software. Even if the software based unit is described as including one interface, it is to be understood that the unit may include several interfaces for its communication and, thus, its interaction with the test tool according to the invention. The input data to and output data from the software based unit is to be interpreted as a digitized information conveyed by a digital signal.

Tests of software based units can according to the invention be performed in different ways. The recording of input data to and output data from a unit is either done while the unit communicates with a test tool, or while the unit communicates in its normal operating environment, such as with an external unit which the test tool later will be simulating. In both cases the actual verification of a unit based on the recorded data is performed by the test tool. Furthermore, the recording may be performed on an already verified unit or it may involve a parallel manual verification of the unit. The recorded data is then used either for verifying the same unit after, e.g., a redesign or a reconfiguration, or, for verifying another unit of the same type as the unit for which the data was initially recorded. Thus, testing or development personnel can repeat the test cases for which input/output data have been recorded over and over again with a minimal amount of manual interaction.

If the software based unit subject to verification communicates with its environment by means of a packet data protocol, such as TCP/IP or X.25, the invention makes it feasible not only to verify such things as sequence numbering of the transferred data packets, but also any other information carried by the data packets.

BRIEF DESCRIPTION OF THE DRAWINGS

Further features and advantages of the invention will become more readily understood from the following detailed description of exemplifying embodiments of the invention when taken in conjunction with the accompanying drawings in which like reference characters are used for like features, and in which:

FIG. 5b shows an exemplifying system in which pre-recorded input data is applied to the software based unit, and output data from the unit is compared with pre-recorded output data, in accordance with the embodiment previously referred to by FIG. 5a.

DETAILED DESCRIPTION OF THE PREFERRED EMBODIMENTS

Figure 1:
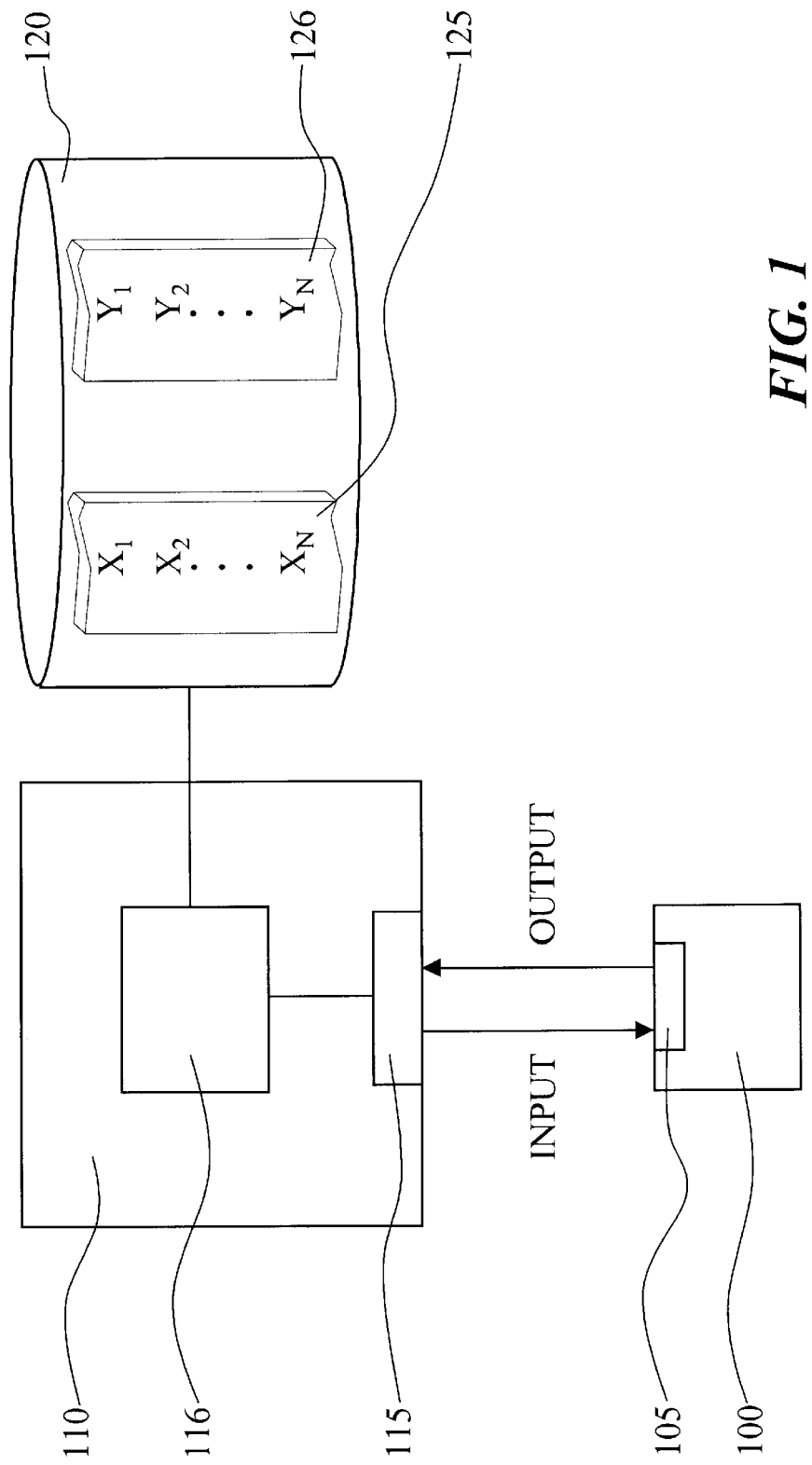
FIG. 1 schematically illustrates a test tool and the operation of verifying a software based unit in accordance with some of the basic principles utilised by the present invention.

In FIG. 1, the basic operations which form the basis for the present invention when verifying a software based unit 100 using a test tool 110 is schematically shown. The test tool is connected to the interface(s) 105 of the unit 100 which functionality is to be tested and verified. In FIG. 1, the unit 100 is equipped with one interface 105, via which it receives input data and transmits output data. However, the unit 100 might alternatively be equipped with several interfaces, e.g., one interface for its input data and one interface for its output data. The test tool 110 is also connected to a data base 120 which includes stored data to be used by the test tool for testing and verifying the unit 100. This data in the data base includes stored input data 125 and stored output data 126.

The test tool 110 in FIG. 1 includes interface means 115 for communicating with the unit 100 and its interface 105. As will be appreciated by a person skilled in the art, the interface means 115 is chosen so as to be compatible with the unit's interface 105 in order to enable data communication between the test tool 110 and the unit 100. For the same reason, the interface means 115 is controlled by appropriate communications software being compatible with the communication protocol applied by the unit's 100 interface 105. The communication protocol used by the unit's interface 105 is any state of the art protocol or any proprietary protocol on which the design of the interface 105 is based. The only requirement when using the present invention is that the communications protocol used by the interface 105 of the unit 100 is well defined and known in advance, thus facilitating the design of a test tool 110 which includes a compatible interface 115 controlled by compatible communications protocol software.

The test tool 110 of FIG. 1 furthermore includes processing means 116 which is programmed to execute computer instructions for causing the test tool 110 to perform the operations which according to the invention are needed for verifying the software based unit 100. The implementation of these operations as computer instructions for the processing means 116 will be appreciated by a person skilled in the art. Furthermore, the test tool 110 provides an interface (not shown), preferably a graphical user interface, to an operator of the test tool for facilitating interaction with the test tool. This interaction includes, from an operator point of view, such things as requesting the test tool to perform certain test cases as well as reception of reports concerning the outcome of the test cases which have been performed.

When verifying the software based unit 100, the verification is performed by testing the unit in accordance with one or more predefined test cases. The database 120 stores the pre-recorded input data 125 and the pre-recorded output data 126 for these test cases. The stored input data 125 for a specific test case is the data that should be inputted to the interface 105 of the unit 100 during that particular test.

Correspondingly, the stored output data 126 for the same test case is the data that should be outputted from the interface 105 during the test if the functioning of the unit 100 is correct.

When the unit 100 is to be made subject to a particular test case, the test tool 110 reads the input data 125 corresponding to the test case from the data base 120, i.e., the pre-recorded input data is recovered. It then transmits this input data 125 to the interface 105 of the unit via the interface means 115 and the communication line(s) interconnecting the two interfaces. After, or in parallel with, the transmission of the input data 125, the test tool 110 receives output data transmitted from the unit 100 via the interface 105 and the communication line(s) in response to the transmitted input data 125. The test tool 110 then reads, or it has already previously read, the output data 126 corresponding to the test case from the database 120, i.e., it has recovered the pre-recorded output data. The test tool compares the output data received from the unit 100 in response to the input data 125 of the test case with the output data 126 read from the database 120 and corresponding to the same test case. If these both sets of output data are in correspondence, the unit 100 has passed the test and the unit's functionality which is associated with the test case has been verified.

Figure 2:
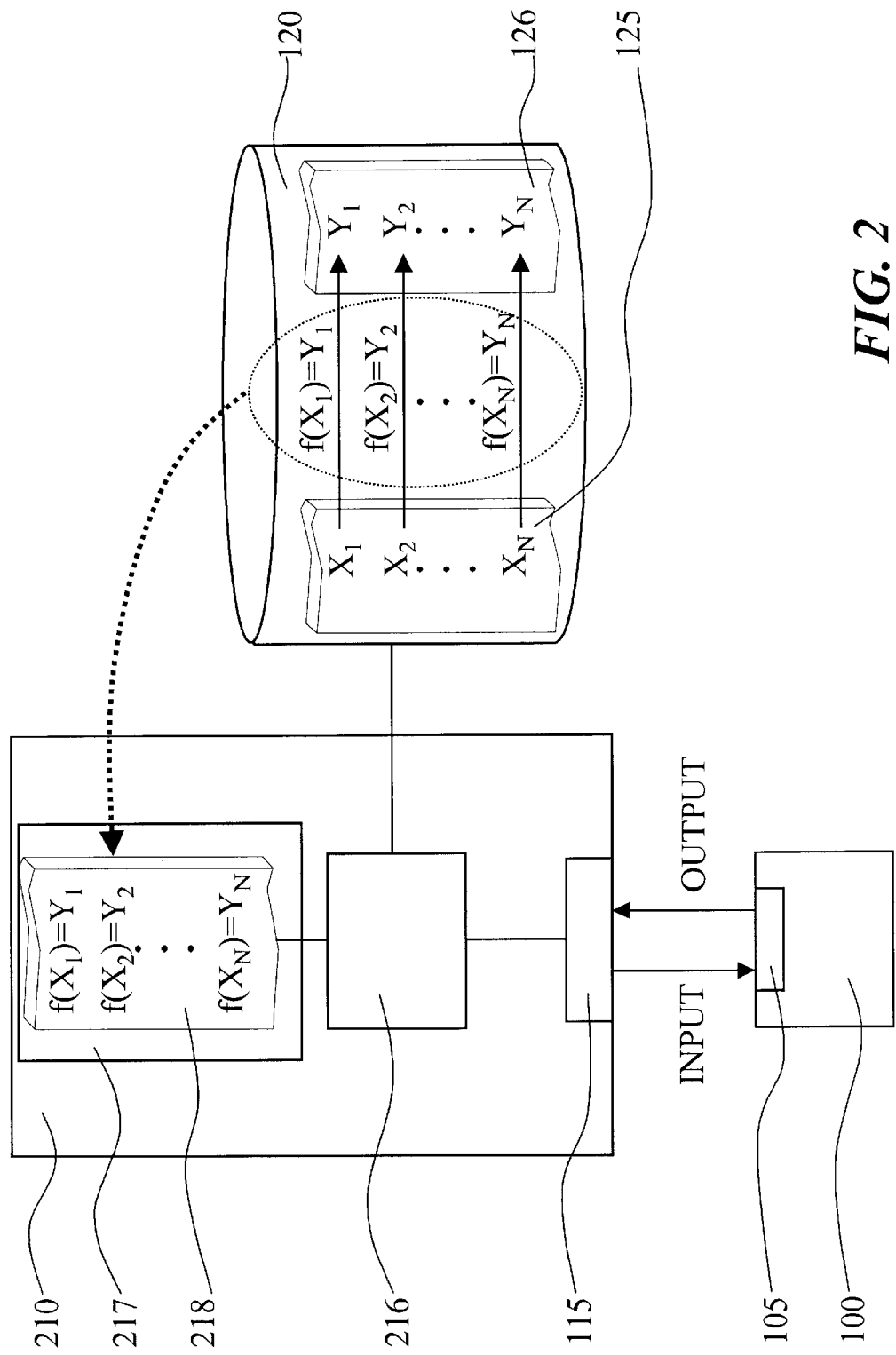
FIG. 2 schematically illustrates a test tool and the operation of verifying a software based unit in accordance with an embodiment of the invention.

With reference to FIG. 2, an embodiment of the present invention is schematically shown. This embodiment is similar to that of FIG. 1, and, besides what is being described below with reference to FIG. 2, the elements of FIG. 2 having corresponding elements in FIG. 1 operate and interact in accordance with what has previously been described with reference to FIG. 1. Therefore, only the features and operations being different from that of FIG. 1 are described below.

In the embodiment referred to by FIG. 2, the test tool 210 differs from the test tool previously described with reference to FIG. 1 in that it also includes a storage means 217, i.e., a computer readable memory, for storing parts of and relationships 218 between the input data 125 and the output data 126. This storage means will sometimes be denoted relation store. The operations for verifying the unit 100 correspond to those operations described above with reference to FIG. 1 apart from what will now be described.

As previously, the test tool 210 reads the input data 125 and output data 126 from the database 120, i.e., it recovers pre-recorded input data and pre-recorded output data. The input data 125 is then analyzed and the information that is necessary in order to reproduce the original test case is extracted from input data 125. It is assumed that the input data 125 follows the same well-specified protocol in accordance with which the interface 105 of the unit 100 operates. Thus, a certain set of input data to the unit 100 will result in a corresponding set of output data being transmitted from the unit. However, this set of output data might vary in dependence upon the internal state of the unit 100 when the input data is applied to the unit. Thus, if the unit 100 which is subject to a test can be in one or more different internal states, it is preferred to make sure that the unit prior to performing the test is in the same internal state as that of a unit when the output data of the test case was recorded. This can be achieved in a number of ways, either by a command to the unit via the test tool 210 and its associated operator interface (not shown), manual interaction with the unit 100, or by making sure the test cases are performed in a certain sequence. For this reason it is preferred to group a number of test cases and perform these as a one test entity.

In addition, the actual output data from unit 100 during a test may vary for other reasons. The information received by and/or transmitted from the unit 100 may include real-time information, such as time of day or a parameter indicating the sequence number of a particular piece of information (which is common if the unit 100 communicates in accordance with a packet data protocol).

Therefore, in the present embodiment, an analysis is performed of the input data 125 and the output data 126 read from the database 120. Useful information can thereby be extracted and any unnecessary information removed from the recorded input and/or output data. This extraction/removal of data is preferably performed by means of a software program specifically designed for the task and executed within the test tool. Alternatively, it is performed by means of manual interaction using a graphical user interface connected to the test tool. In which case there will be a manual transfer of relevant input/output data to the storage means 217 from the database 120.

Some of the useful input data and output data which then will be stored in the storage means 217 will have certain relationships with each other. These relationships can be described as a function f, or possible several functions, that for a certain input data X gives a certain output data Y as a result. This function(s) is inter alia designed in such way that certain information in the expected output data, which expected output data the actual output data from unit 100 is compared with, is made dependent upon certain information in the input data. For example, imagine that the unit to be tested communicates over a packet data connection and that the input data 125 includes the following information fields:

. . . <23:10:45><17><character string#2>. . .

where the first field is a time stamp, the second field a sequence number and the third field certain information payload. The corresponding output data 126 have the same fields with the following content:

. . . <23:10:55><19><character string#6>. . .

After unnecessary information has been removed, the output data to be stored in the storage means 217, and which will be used for comparison, has the following information in the same fields:

. . . <don't care><inp.seq.no+2><character string#6>. . .

i.e., the sequence number of the expected output data can be described with a function f which takes the input sequence number as input (i.e., f(inp.seq.no)=out.seq.no).

This illustrates how at least some of the pre-recorded output data is replaced with functional relationships. These functional relationships between the originally stored input data and output data, i.e., the pre-recorded input data and pre-recorded output data, can be said to form a set of functional output data. This functional output data is made part of the expected output data with which the actual output data from unit 100 during a test sequence is to be compared with. The above also illustrates the removal of certain information, e.g., real-time information in the form of time stamps, from the recorded input/output data which is considered as irrelevant to an actual test case. In other words some of the information of the output data received from the unit during a test case is filtered while the test is being performed.

Thus, for a specific test case at least a part of the corresponding input data 125 and at least a part of the output data 126 are stored in the storage means 217. Both the input data applied to the unit as well as the output data used for comparison with the unit's responding output data are retrieved from the storage means 217.

Figure 3:
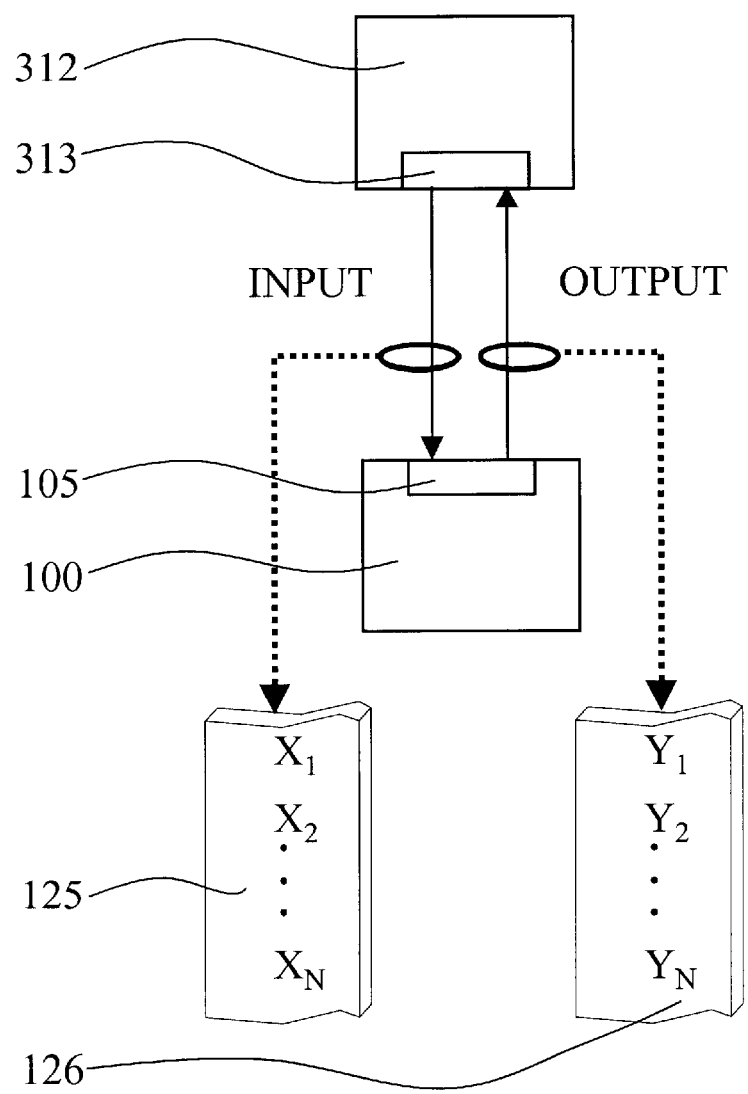
FIG. 3 schematically illustrates the operation of recording input data to, and output data from, a software based unit, which input/output data are suitable for use in connection with the principles described with reference to FIG. 1 and in the embodiment of the invention referred to by FIG. 2.

In FIG. 3 the recording of the input data to, and output data from, a software based unit in accordance with an embodiment of the invention is schematically illustrated. The recorded data is suitable for use in connection with the principles described with reference to FIG. 1 and in the embodiment of the invention referred to by FIG. 2.

In FIG. 3, a unit 100, which is identical with or of the same type as the unit to be tested with the recorded data, is arranged in communication with an authentic external unit 312 with which the unit 100 communicates under normal operating conditions. The unit 100 is a unit which is known to function correctly, e.g., as a result of a manual verification in accordance with state of the art methods. When the unit 100 operates in accordance with a predefined test case, the communication between the two units is recorded. The data transmitted to unit 100 from the external unit 312 is recorded and stored as a set of input data 125 for the test case. The data transmitted from the unit 100 is recorded and stored as a set of output data 126 for the same test case. The two sets of recorded data are preferably stored in a database (as indicated in FIGS. 1 and 2). The recording of data is performed in such way as to not effect the communication between the units.

Alternatively, reference numeral 312 denotes the above-mentioned test tool. In this case the test tool is designed to simulate the above-mentioned external unit. The input data 125 is simply the input data of the test case which data is inputted manually via the above-mentioned user interface, or it is data which have been automatically generated by means of any state of the art test tool for such purpose. Furthermore, the output data transmitted from the unit in response to the input data is verified manually before being stored as output data 126 in the database.

Irrespective of whether unit 312 is the above-mentioned external unit or the above-mentioned test tool, the communication between unit 100 and unit 312 is performed in accordance with a common protocol and enabled by suitable interfaces, 105 and 313, of the communicating parties in accordance with what has previously been described.

Figure 4:
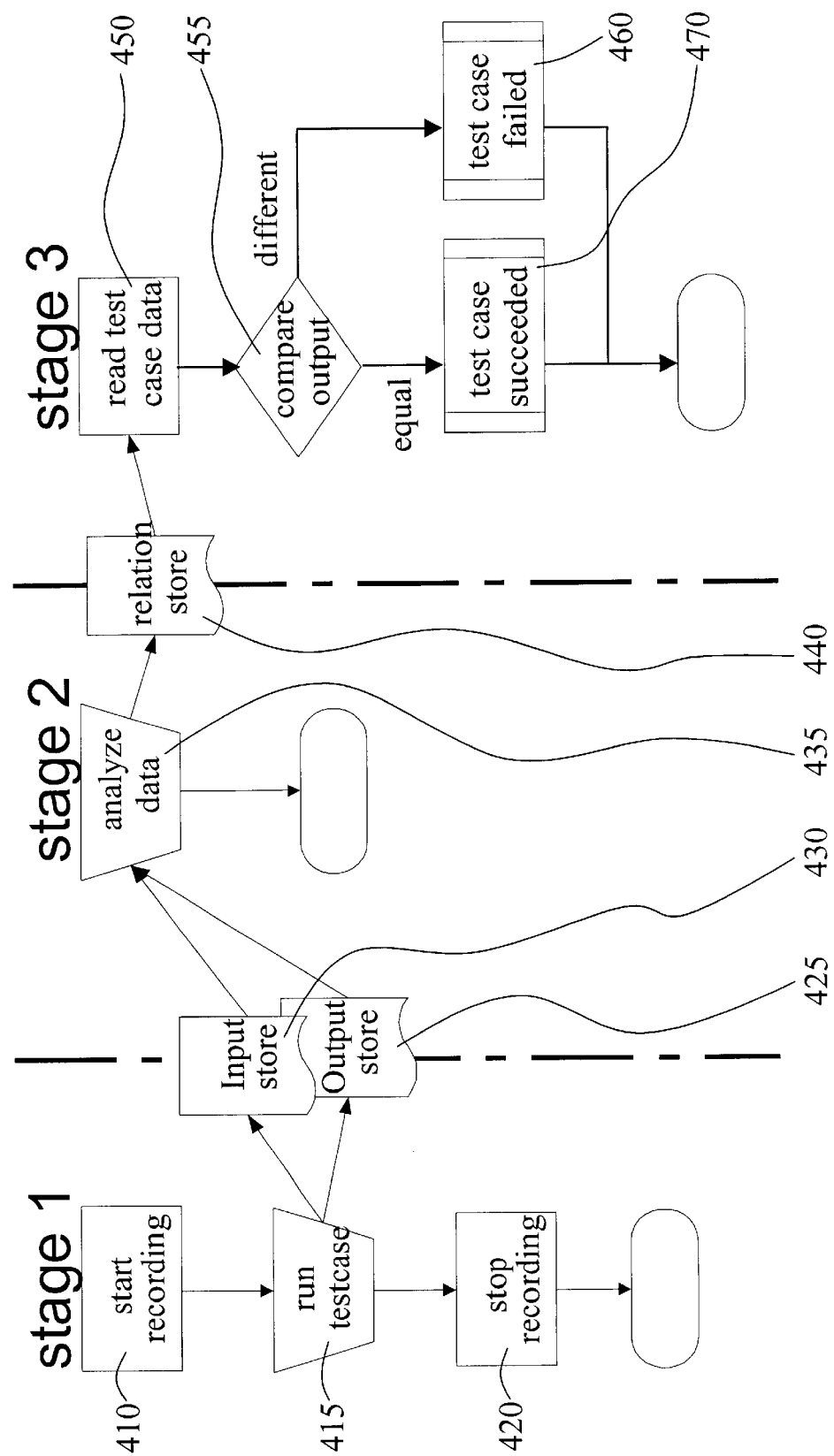
FIG. 4 shows, in a flow chart like manner, the operations performed when verifying a software based unit in accordance with an embodiment of the invention.

FIG. 4 shows a diagram having resemblance with a flow chart for illustrating the operations performed when verifying a software based unit in accordance with an embodiment of the invention. The overall process of verifying a unit can be seen as a process that comprise three stages. The first two stages involve preparations and the third stage the actual verification.

The first stage concerns the recording of input data and output data and has previously been described with reference to FIG. 3. In step 410 the recording of input data to, and output data from, the unit is started. In step 415 a test case is run, either while the software based unit is communicating with its normal operating environment or while the unit is communicating with a test tool. During the test case the input data transmitted to the unit is stored in an input store 430 and the output data transmitted from the unit in an output store 425. After the test case has been run the recording stops in step 420.

The second stage concerns the analysis of the recorded input data and output data and has previously been described with reference to FIG. 2. This analysis is performed in step 435 and involves extracting useful information and removing unnecessary information from the recorded data. Thus, the test tool reads the input store and the output store, i.e., it recovers pre-recorded input data and pre-recorded output data, e.g., from a database, extracts useful data and removes unwanted data, and then stores the remaining input data and output data, which output data now includes functional output data defining derived functional relationships, in a relation store 440 within the test tool.

The third stage concerns verification of the output data transmitted from a tested unit during a test case and has previously been described with reference to FIG. 2. In step 450 the input data and the output data of a test case are read from the relation store 440 by the test tool. The read input data is then transmitted to the software based unit to be tested. In step 455 the output data received from the unit in response to the transmitted input data is compared with the output data, and its included functional output data, read from the relation store. If the output data received from the unit differs from the output data read from the relation store, it is in step 460 reported to an operator of the test tool, or to a log file, that the test case failed. Alternatively, if the two sets of output data are equal to each other, it is in step 470 reported to the operator/log file that the test case succeeded.

Figure 5A:
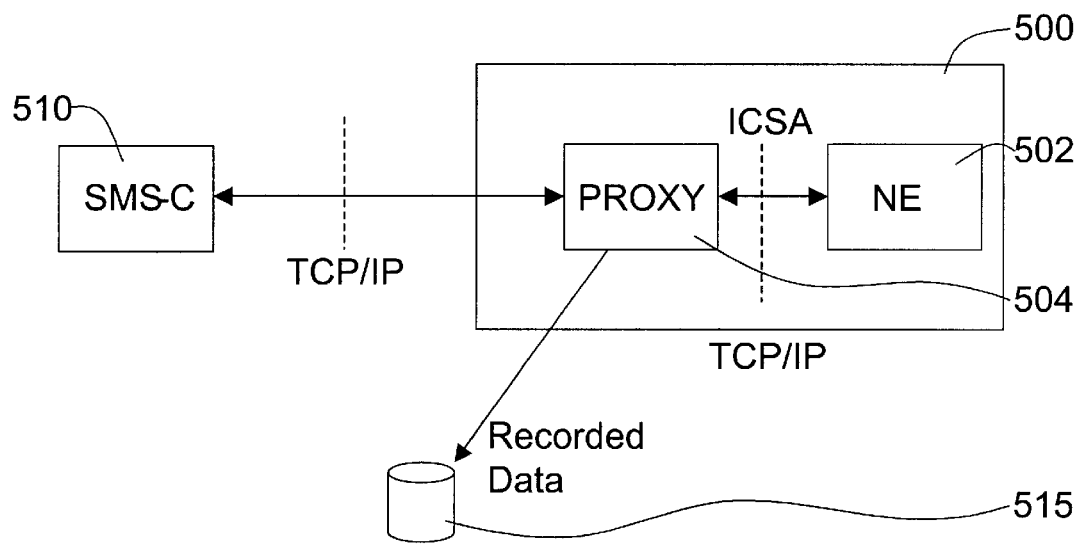
FIG. 5a shows an exemplifying system in which input data to, and output data from, a software based unit are recorded in accordance with another embodiment of the invention.
Figure 5B:
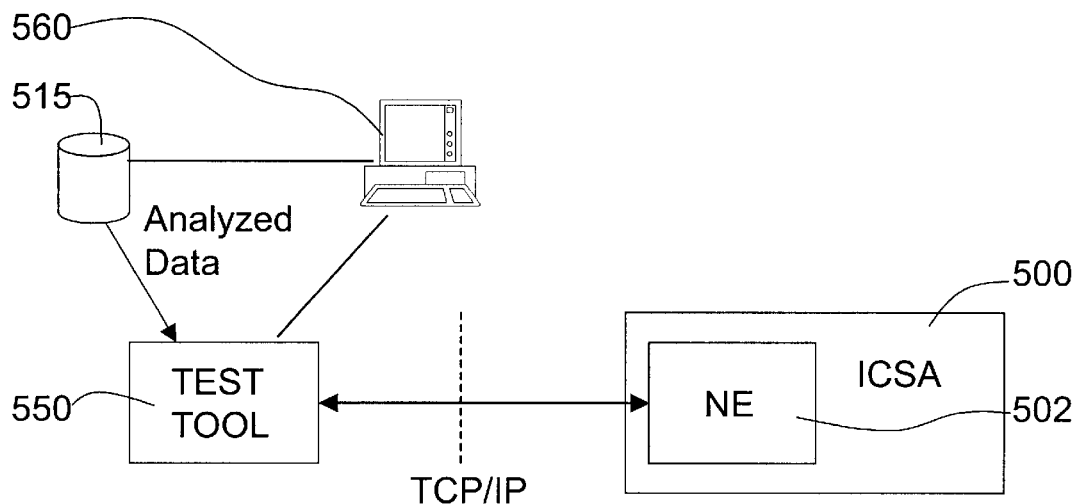

FIGS. 5a and 5b show an exemplifying embodiment of the present invention applied to a specific system. In FIG. 5a it is exemplified how input data to, and output data from, a software based unit are recorded and stored. FIG. 5b exemplifies the steps of applying pre-recorded input data to the software based unit, and comparing output data from the unit with pre-recorded output data, when the invention is applied to this specific system.

The embodiment referred to by FIGS. 5a and 5b relates to the verification of a software based unit known as the Notification Engine (NE) which is included in the Internet Cellular Smart Access platform (ICSA, which is a trademark of Microsoft Corporation). ICSA is a system platform which enable an operator to provide a number of mobile services to its subscribers. For example, the services of sending and receiving e-mails using a mobile station which may or may not be connected to a portable computer.

One characterising feature of the ICSA platform is the transmission of SMS (Short Message Service) messages which includes notifications relating to e-mails temporary stored by the system. When a mail server included in the ICSA platform receives an e-mail addressed to a specific user, an SMS message with a notification identifying the e-mail is transmitted to a mobile station associated with the e-mail address. The SMS message is transmitted via an SMS-C (SMS Center) in the cellular communication system. Using the information of the notification the user of the mobile station can retrieve the e-mail stored by the system.

The unit responsible in the ICSA platform for transmitting notifications is called the Notification Engine (NE). The NE communicates with the SMS-C over a packet data connection in accordance with a communication protocol used by the SMS-C. It should be noted that different manufacturer of different SMS-C use slightly different protocols for this communication. The differences concerns, e.g., the usage of sequence numbers and time stamps within the data packets. Examples of such different SMS-C protocols are the SMS-C protocols under the names of SMPP, CIMD, SMS-2000, EMI etc. from different respective manufacturers. Therefore, the NE needs to be adapted to the particular SMS-C with which it is to communicate. One way to achieve this adaptation is to incorporate an internal state machine within the NE that controls parts of the functioning of the NE so as to be compatible with the protocol used by the specific SMS-C. The communication between the SMS-C and the NE generally relates to SMS messages. However, certain SMS-C also supports a mail transfer protocol, such as the SMTP (Simple Mail Transfer Protocol).

The NE within the ICSA platform may advantageously be verified in accordance with the present invention. The invention enables testing personnel to easily repeat certain tests for the same physical NE, or for a number of different NE:s of the same design. Furthermore, using the present invention, new versions/releases of an NE or its included components will be possible to verify in a faster and simplified way with a minimised amount of manual interaction from the testing personnel.

The embodiment described by FIGS. 5a and 5b can be seen as a specialized example of the embodiment previously described with reference to FIGS. 2 and 3. Thus, the features and operations which are not explicitly explained below should be read and understood with the descriptions of FIGS., 2 and 3 in mind.

In FIG. 5a an ICSA platform 500 is set up to communicate with an external client/server in the form of an SMS-C 510. The parties communicate using a packet data connection in accordance with the TCP/IP protocol. Included in the ICSA platform is a Notification Engine 502 and also a proxy server 504. The proxy server 504 and the NE communicates within the ICSA platform over a TCP/IP connection. Thus, the communication between the SMS-C 510 and the NE 502 is relayed by the proxy server 504. In order for the proxy server to be able to intercept the client-server connection, it includes both a client side and a server side. Even though the proxy 504 is depicted as being included by the ICSA platform 500, it is preferred if the proxy simply is executed on the same hardware as the ICSA platform. The proxy server uses a local host connection towards the ICSA platform and a normal TCP/IP connection towards the SMS-C 510. The reason for including the proxy server is to be able to record the data traffic to/from the NE during a number of defined test cases. While the proxy relays data to/from the NE it copies the data to a buffer which content in turn is regularly copied to a file in the database 515. Thus, for each test case the input data to the NE 502 and the corresponding output data from the NE 502 is recorded by the proxy 504 and stored in a database 515.

In FIG. 5b the ICSA platform 500 and its included NE 502 is instead set up to communicate with a test tool 550 without the interaction of any proxy server. The purpose of this set-up is to verify the NE's functionality when it operates in accordance with a number of predefined test cases. The test tool 550 simulates the operation of the SMS-C in FIG. 5b. The test tool is designed to include a state machine which mimics the behavior of the particular SMS-C which it simulates. Connected to the test tool is a computer 560 which enables an operator to interact with the test tool.

Prior to performing an actual test, the test tool 550 reads the corresponding pre-recorded input/output data from the database 515. It then derives functional output data based on functional relationships between the pre-recorded input and output data, as previously described. Thus, the test tool extracts the useful information of the pre-recorded input/output data and removes any other data, i.e., it parses and filters the input/output data, preferably by means of a software program designed for the task. This parsed and filtered input/output data, which includes functional output data, is then stored in a memory within the test tool 550, or written back to the database 515. Alternatively, the parsing and filtering is performed manually by the operator using the computer 560 by first reading the recorded input/output from the database 515 and then writing the parsed and filtered data back to the database 515.

The following exemplifies the meaning of parsing and filtering performed with respect to the input/output data. Imagine that the recorded data (either input or output) has the following content:

"some data[data:12345]some other data[comment:some information]yet some data[data:6789]..."

If useful data is parsed out following the rules that "["start a parse field and"]" stops a parse field, the parsed data will have the following content:

"[data:12345][comment:some information][data:6789]"

If the parsed data is filtered following the rule that all data starting with "comment" should be removed, the parsed and filtered data, also denoted analyzed data, will then have the following content:

"[data: 12345][data:6789]"

When the operator initiates a specific test case, the test tool reads the analyzed, i.e., the parsed and filtered, input/output data of the test case from its internal memory or from the database 515. The analyzed input data is transmitted to the ICSA 500 platform and the NE 502 to simulate a real traffic case corresponding to the test case. When the test tool receives the reply from the ICSA platform, i.e., the output data from the NE, it compares this data with the previously parsed and filtered pre-recorded output data. If the two sets of output data is in correspondence, the functionality of the NE 502 with respect to the specific test case has been verified, otherwise the NE 502 is malfunctioning.

As stated above, some SMS-C support a mail transfer protocol. Thus, if the whole ICSA platform is regarded as the unit to be verified, the test tool needs to be designed in such way so as to be able to communicate with the ICSA platform and its appropriate interface in accordance with that mail transfer protocol. Using the interface of the test tool, the actual content of an e-mail can then be verified.

Figure 6:
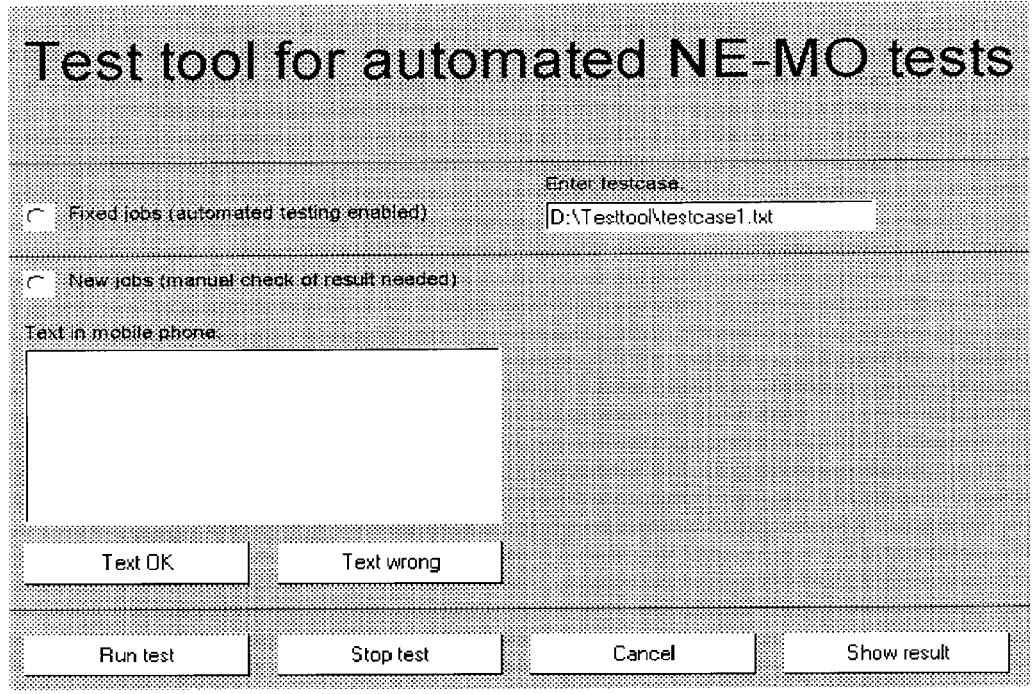
FIG. 6 shows an exemplifying user interface of a test tool according to an embodiment of the invention.

In FIG. 6 an example of a user interface of a test tool according to an embodiment of the invention is illustrated. The interface is, e.g., provided via the screen of a computer, such as the computer (depicted in FIG. 5b, which is connected to the test tool. Using this interface an operator is able to in initiate different test case and to view the results. The operator can also examine pre-recorded input/output data as well as the output data with which a unit replies in response to certain applied input data. The user interface preferably support two different types of tests, automatic and semi-automatic. In the automatic mode, it is possible to start the test by defining which test cases that should run and then press "Run test". The result of the test is then preferably written to a log file. The automatic mode requires that predefined tests are stored in the database and that the corresponding analyzed input/output data are used. Semi-automatic mode enables the user to manually view the result of each test case. The operator then has the option to accept or reject the test case. This type of testing would be suitable for test cases that are not predefined in the database, but where the input data and/or output data of a test case is inputted manually by the operator.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A method for verifying the functionality of a software based unit, the unit being provided with an interface for its external communication, the method comprising:

placing an external test tool in operative communication with the software based unit by means of a packet data connection, wherein data applied to, and received from, said interface is included in data packets and wherein the communication between said test tool and said software based unit is in accordance with a mail transfer protocol;

recovering pre-recorded input data relating to a predefined test case and applying said input data on said interface;

recovering pre-recorded output data having a verified relation with the pre-recorded input data;

replacing at least part of said pre-recorded output data with functional relationships between said pre-recorded input data and said pre-recorded output data, obtaining a set of functional output data; and comparing the output data received from said interface with said set of functional output data.

2. The method as claimed in claim 1, wherein said test tool includes at least one state machine for simulating a signalling sequence of a corresponding protocol which is used by an authentic external unit normally communicating with said software based unit.

3. The method as claimed in claim 2, including the acts of:

deriving relations between pieces of the pre-recorded input data and its corresponding pre-recorded output data; and storing the derived relations in said test tool as functional relationships.

4. The method as claimed in claim 2, wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data; and storing at least part of the recorded input data as said pre-recorded input data and at least part of the recorded output data as said pre-recorded output data for later retrieval by said test tool when said test tool simulates an authentic external unit.

5. The method as claimed in claim 1, including the acts of:

deriving relations between pieces of the pre-recorded input data and its corresponding pre-recorded output data; and storing the derived relations in said test tool as functional relationships.

6. The method as claimed in claim 1, wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data; and storing at least part of the recorded input data as said pre-recorded input data and at least part of the recorded output data as said pre-recorded output data for later retrieval by said test tool when said test tool simulates an authentic external unit.

7. The method as claimed in claim 6, including the acts of:

deriving relations between pieces of the pre-recorded input data and its corresponding pre-recorded output data; and storing the derived relations in said test tool as functional relationships.

8. The method as claimed in claim 6, including removing unnecessary real-time information from the recorded input and output data.

9. The method as claimed in claim 8, wherein said real-time information includes data sequence numbers and/or time information.

10. The method as claimed in claim 1, wherein the verification of said software based unit includes performing a number of different predefined tests in a sequence.

11. The method as claimed in claim 1, wherein said test tool simulates a Short Message Service Center, SMS-C, included in a Global System for Mobile Communication, GSM, network.

12. A test tool for verifying the functionality of a software based unit, the software based unit being provided with an interface for its external communication, the test tool comprising:

a) interface means for enabling operative communication with the software based unit by means of a packet data connection, wherein the communicated data is included in data packets;

b) processing means for:

reading pre-recorded input data relating to a predefined test case;

applying the pre-recorded input on said software based unit via said interface means;

reading pre-recorded output data relating to said pre-defined test ease, the pre-recorded output data having a verified relation with the pre-recorded input data;

replacing at least part of said pre-recorded output data with functional relationships between said pre-recorded input data and said pre-recorded output data, obtaining a set of functional output data;

comparing the output data received from said software based unit via said interface means with said set of functional output data; and wherein the execution of said processing means is controlled by at least one state machine which simulates a signalling sequence of a corresponding protocol which is used by an authentic external unit normally communicating with said software based unit, said state machine being defined to operate in accordance with a protocol used by a Short Message Service Center, SMS-C, of a specific type, which SMS-C is included in a Global System for Mobile Communication, GSM, network; and c) memory means for storing said functional relationships to be provided to said processing means.

13. The test tool as claimed in claim 12, wherein said processing means are further provided for:

deriving relations between pieces of said pre-recorded input data and its corresponding pre-recorded output data; and storing the derived relations in said memory means as functional relationships.

14. The test tool as claimed in claim 13, wherein said processing means are arranged to remove unnecessary real-time information from the recorded input and output data.

15. The test tool as claimed in claim 14, wherein said real-time information includes data sequence numbers and/or time information.

16. The test tool as claimed in claim 12, wherein said processing means are further provided for:

deriving relations between pieces of said pre-recorded input data and its corresponding pre-recorded output data; and storing the derived relations in said memory means as functional relationships.

17. The test tool as claimed in claim 12, wherein said processing means is arranged to compare received output data with pre-recorded output data for a number of different predefined tests in a sequence, in order for the test tool to verify said software based unit.

18. The test tool as claimed in claim 12, wherein said interface means is adapted to communicate with said software based unit in accordance with a mail transfer protocol.

19. A method for verifying the functionality of a software based unit, the unit being provided with an interface for its external communication, the method comprising:

placing an external test tool in operative communication with the software based unit by means of a packet data connection, wherein data applied to, and received from, said interface is included in data packets and wherein said test tool simulates a Short Message Service Center, SMS-C, included in a Global System for Mobile Communication, GSM, network;

recovering pre-recorded input data relating to a predefined test case and applying said input data on said interface;

recovering pre-recorded output data having a verified relation with the pre-recorded input data;

replacing at least part of said pre-recorded output data with functional relationships between said pre-recorded input data and said pre-recorded output data, obtaining a set of functional output data; and comparing the output data received from said interface with said set of functional output data.

20. The method as claimed in claim 19, wherein said test tool includes at least one state machine for simulating a signalling sequence of a corresponding protocol which is used by an authentic external unit normally communicating with said software based unit.

21. The method as claimed in claim 19, including the acts of:

deriving relations between pieces of the pre-recorded input data and its corresponding pre-recorded output data; and storing the derived relations in said test tool as functional relationships.

22. The method as claimed in claim 20, including the acts of:

deriving relations between pieces of the pre-recorded input data and its corresponding pre-recorded output data; and storing the derived relations in said test tool as functional relationships.

23. The method as claimed in claim 19, wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data; and storing at least part of the recorded input data as said pre-recorded input data and at least part of the recorded output data as said pre-recorded output data for later retrieval by said test tool when said test tool simulates an authentic external unit.

24. The method as claimed in claim 23, including the acts of:

deriving relations between pieces of the pre-recorded input data and its corresponding pre-recorded output data; and storing the derived relations in said test tool as functional relationships.

25. The method as claimed in claim 23, including removing unnecessary real-time information from the recorded input and output data.

26. The method as claimed in claim 25, wherein said real-time information includes data sequence numbers and/or time information.

27. The method as claimed in claim 20, wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data; and storing at least part of the recorded input data as said pre-recorded input data and at least part of the recorded output data as said pre-recorded output data for later retrieval by said test tool when said test tool simulates an authentic external unit.

28. The method as claimed in claim 19, wherein the verification of said software based unit includes performing a number of different predefined tests in a sequence.

29. A method for verifying the functionality of a software based unit, the unit being provided with an interface for its external communication, the method comprising:

placing an external test tool in operative communication with the software based unit by means of a packet data connection, wherein data applied to, and received from, said interface is included in data packets;

recovering pre-recorded input data relating to a predefined test case and applying said input data on said interface;

recovering pre-recorded output data having a verified relation with the pre-recorded input data;

replacing at least part of said pre-recorded output data with functional relationships between said pre-recorded input data and said pre-recorded output data, obtaining a set of functional output data; and comparing the output data received from said interface with said set of functional output data; and wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data;

storing at least part of the recorded input data as said pre-recorded input data and at least part of the recorded output data as said pre-recorded output data for later retrieval by said test tool when said test tool simulates an authentic external unit; and removing unnecessary real-time information from the recorded input and output data, said real-time information including data sequence numbers and/or time information.

30. The method as claimed in claim 29, wherein said test tool includes at least one state machine for simulating a signalling sequence of a corresponding protocol which is used by an authentic external unit normally communicating with said software based unit.

31. The method as claimed in claim 30, including the acts of:

deriving relations between pieces of the pre-recorded input data and its corresponding pre-recorded output data; and storing the derived relations in said test tool as functional relationships.

32. The method as claimed in claim 30, wherein said software based unit, or a unit of the same type as said software based unit, in an initial act is arranged to communicate with an authentic external unit over said interface and in accordance with said predefined test case, including the acts of:

recording input data terminating in said interface during said test case;

recording output data originating from said interface during said test case;

verifying the recorded output data; and storing at least part of the recorded input data as said pre-recorded input data and at least part of the recorded output data as said pre-recorded output data for later retrieval by said test tool when said test tool simulates an authentic external unit.

33. The method as claimed in claim 29, including the acts of:

deriving relations between pieces of the pre-recorded input data and its corresponding pre-recorded output data; and storing the derived relations in said test tool as functional relationships.

34. The method as claimed in claim 29, including the acts of:

deriving relations between pieces of the pre-recorded input data and its corresponding pre-recorded output data; and storing the derived relations in said test tool as functional relationships.

35. The method as claimed in claim 29, wherein the verification of said software based unit includes performing a number of different predefined tests in a sequence.

36. The method as claimed in claim 29, wherein said test tool simulates a Short Message Service Center, SMS-C, included in a Global System for Mobile Communication, GSM, network.

37. A test tool for verifying the functionality of a software based unit, the software based unit being provided with an interface for its external communication, the test tool comprising:

a) interface means for enabling operative communication with the software based unit by means of a packet data connection, wherein the communicated data is included in data packets, said interface means being adapted to communicate with said software based unit in accordance with a mail transfer protocol;

b) processing means for:

reading pre-recorded input data relating to a predefined test case;

applying the pre-recorded input on said software based unit via said interface means;

reading pre-recorded output data relating to said predefined test case, the pre-recorded output data having a verified relation with the pre-recorded input data;

replacing at least part of said pre-recorded output data with functional relationships between said pre-recorded input data and said pre-recorded output data, obtaining a set of functional output data; and comparing the output data received from said software based unit via said interface means with said set of functional output data; and c) memory means for storing said functional relationships to be provided to said processing means.

38. The test tool as claimed in claim 37, wherein said processing means are further provided for:

deriving relations between pieces of said pre-recorded input data and its corresponding pre-recorded output data; and storing the derived relations in said memory means as functional relationships.

39. The test tool as claimed in claim 38, wherein said processing means are arranged to remove unnecessary real-time information from the recorded input and output data.

40. The test tool as claimed in claim 39, wherein said real-time information includes data sequence numbers and/or time information.

41. The test tool as claimed in claim 37, wherein said processing means is arranged to compare received output data with pre-recorded output data for a number of different predefined tests in a sequence, in order for the test tool to verify said software based unit.

42. The test tool as claimed in claim 37, wherein said interface means is adapted to communicate with said software based unit in accordance with a mail transfer protocol.

43. A test tool for verifying the functionality of a software based unit, the software based unit being provided with an interface for its external communication, the test tool comprising:

a) interface means for enabling operative communication with the software based unit by means of a packet data connection, wherein the communicated data is included in data packets;

b) processing means for:

reading pre-recorded input data relating to a predefined test case;

applying the pre-recorded input on said software based unit via said interface means;

reading pre-recorded output data relating to said predefined test case, the pre-recorded output data having a verified relation with the pre-recorded input data;

replacing at least part of said pre-recorded output data with functional relationships between said pre-recorded input data and said pre-recorded output data, obtaining a set of functional output data; and comparing the output data received from said software based unit via said interface means with said set of functional output data;

deriving relations between pieces of said pre-recorded input data and its corresponding pre-recorded output data;

storing the derived relations in said memory means as functional relationships; and wherein said processing means are arranged to remove unnecessary real-time information from the recorded input and output data, said real-time information comprising data sequence numbers and/or time information; and c) memory means for storing said functional relationships to be provided to said processing means.

44. The test tool as claimed in claim 43, wherein said processing means is arranged to compare received output data with pre-recorded output data for a number of different predefined tests in a sequence, in order for the test tool to verify said software based unit.

45. The test tool as claimed in claim 43, wherein said interface means is adapted to communicate with said software based unit in accordance with a mail transfer protocol.

* * * * *